United States Patent [19]

Chu et al.

[11] Patent Number: 5,077,253
[45] Date of Patent: Dec. 31, 1991

[54] LAYERED CRACKING CATALYST AND METHOD OF MANUFACTURE AND USE THEREOF

[75] Inventors: Pochen Chu, Voorhees, N.J.; Albin Huss, Jr., Chadds Ford, Pa.; Hartley Owen, Belle Mead, N.J.; Joseph A. Herbst, Turnersville, N.J.; Garry W. Kirker, Washington Township, Gloucester County, N.J.; Paul H. Schipper, Wilmington, Del.

[73] Assignee: Mobil Oil Corporation, Fairfax, Va.

[21] Appl. No.: 516,482

[22] Filed: May 1, 1990

Related U.S. Application Data

[63] Continuation-in-part of Ser. No. 292,204, Dec. 30, 1988, abandoned, and a continuation-in-part of Ser. No. 335,068, Apr. 7, 1989, Pat. No. 5,001,096, which is a continuation-in-part of Ser. No. 138,002, Dec. 28, 1987, abandoned.

[51] Int. Cl.$^5$ .......................... B01J 29/06; B01J 21/16
[52] U.S. Cl. ........................................ 502/61; 502/65; 502/67; 502/68
[58] Field of Search .................... 502/61, 67, 68, 65

[56] References Cited

U.S. PATENT DOCUMENTS

| | | | |
|---|---|---|---|
| 3,928,172 | 12/1975 | Davis, Jr. et al. | 208/77 |
| 4,239,654 | 12/1980 | Gladrow et al. | 502/67 |
| 4,289,608 | 9/1981 | McArthur | 208/121 |
| 4,309,280 | 1/1982 | Rosinski et al. | 502/67 |
| 4,447,552 | 5/1984 | Hayes et al. | 502/41 |
| 4,612,298 | 9/1986 | Hettinger et al. | 502/65 |
| 4,794,095 | 12/1988 | Walker et al. | 502/64 |
| 4,988,653 | 1/1991 | Herbst et al. | 502/67 |
| 4,988,654 | 1/1991 | Kennedy et al. | 502/67 |

*Primary Examiner*—Carl F. Dees
*Attorney, Agent, or Firm*—Alexander J. McKillop; Charles J. Speciale; Richard D. Stone

[57] ABSTRACT

A layered catalyst contains a core of at least one, and preferably three, molecular sieve components within a shell layer of reduced molecular sieve content. A preferred catalyst consists of a core of a large pore molecular sieve, preferably a dealuminized Y-type zeolite, a shape selective paraffin cracking/isomerization component, preferably HZSM-5, and a shape selective aliphatic aromatization component, preferably gallium ZSM-5, within a shell of an alumina-rich, matrix. The shell can capture metals from the feeds being processed, it can act as a metals sink, and can remove metals from the unit by attrition. The catalyst is preferably prepared by forming the core and then coating or encapsulating the core with a shell having a reduced molecular sieve content. The shell may contain a pillared clay or other very large pore cracking component. The shell may be an attritable coating of an amorphous rare earth oxide, aluminum oxide and aluminum phosphate composite, which traps metals.

24 Claims, 1 Drawing Sheet

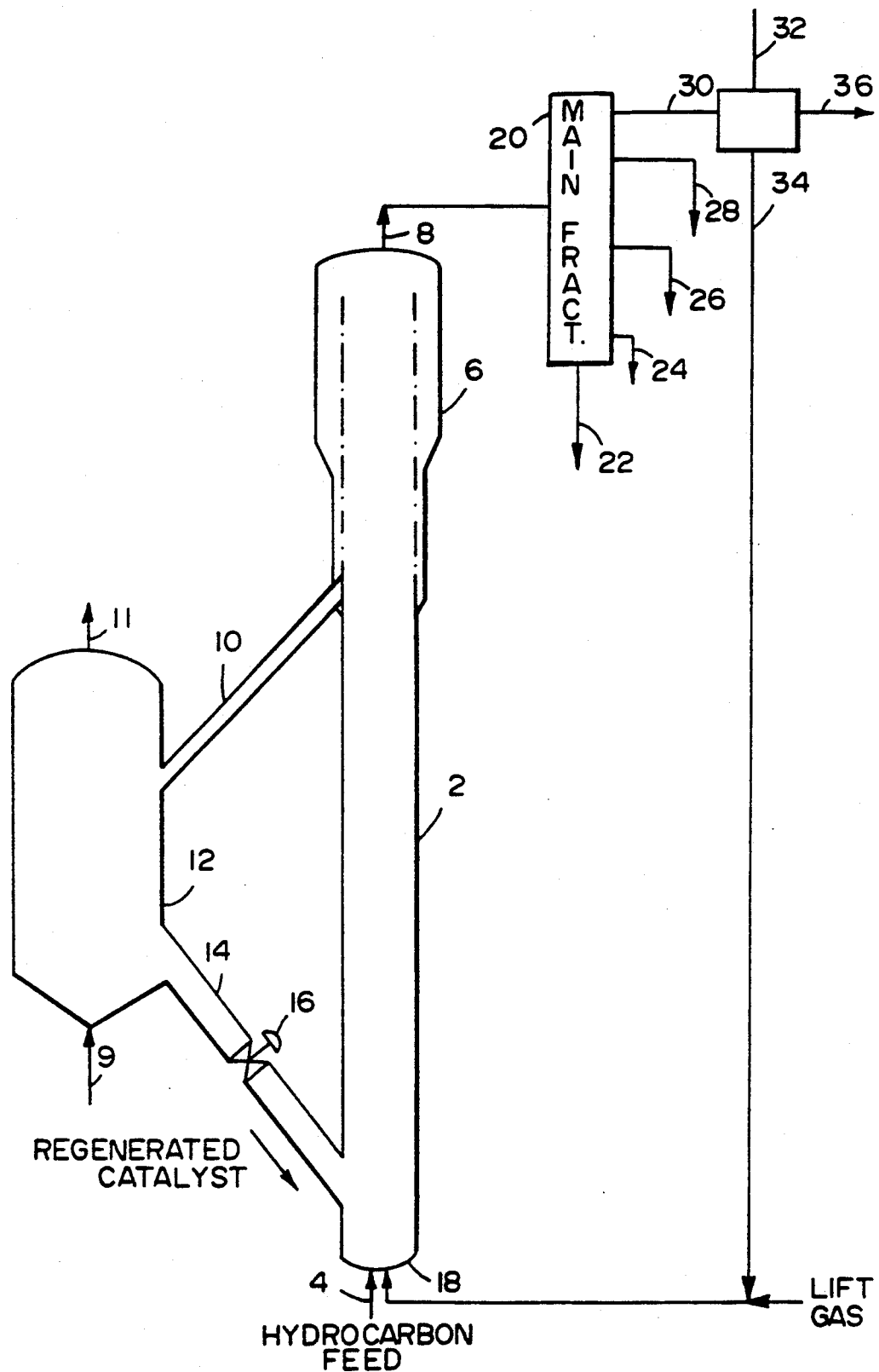

LAYERED CRACKING CATALYST AND METHOD OF MANUFACTURE AND USE THEREOF

CROSS-REFERENCE TO RELATED APPLICATIONS

This application is a continuation in part of our prior co-pending application U.S. Ser. No. 292,204, filed Dec. 30, 1988, and now abandoned.

This application is also a continuation in part of our prior co-pending application U.S. Ser. No. 335,068, filed Apr. 7, 1989, which is a continuation-in-part of parent application U.S. Ser. No. 138,002 filed Dec. 28, 1987, and now abandoned.

All of these related applications are incorporated herein by reference.

FIELD OF THE INVENTION

This invention relates to catalytic cracking of heavy hydrocarbon oils to produce liquid hydrocarbons boiling in the gasoline and distillate range.

BACKGROUND OF THE INVENTION

The present invention can best be understood in the context of its contribution to conventional FCC processes. Accordingly, a brief discussion of conventional cracking processes and catalysts follows.

Conversion of heavy petroleum fractions to lighter products by catalytic cracking is well known in the refining industry. Fluidized Catalytic Cracking (FCC) is particularly advantageous for that purpose. The heavy feed contacts hot regenerated catalyst and is cracked to lighter products. Carbonaceous deposits form on the catalyst, thereby deactivating it. The deactivated (spent) catalyst is separated from cracked products, stripped of strippable hydrocarbons and conducted to a regenerator, where coke is burned off the catalyst with air, thereby regenerating the catalyst. The regenerated catalyst is then recycled to the reactor. The reactor-regenerator assembly are usually maintained in heat balance. Heat generated by burning the coke in the regenerator provides sufficient thermal energy for catalytic cracking in the reactor. Control of reactor conversion is usually achieved by controlling the flow of hot regenerated catalyst to the reactor to maintain the desired reactor temperature.

In most modern FCC units, the hot regenerated catalyst is added to the feed at the base of a riser reactor. The fluidization of the solid catalyst particles may be promoted with a lift gas. Mixing and atomization of the feedstock may be promoted with steam, equal to 1-5 wt % of the hydrocarbon feed. Hot catalyst (650° C.+) from the regenerator is mixed with preheated (150°-375° C.) charge stock. The catalyst vaporizes and superheats the feed to the desired cracking temperature usually the feed is cracked, and coke deposits on the catalyst. The coked catalyst and the cracked products exit the riser and enter a solid-gas separation system, e.g., a series of cyclones, at the top of the reactor vessel. The cracked products pass to product separation. Typically, the cracked hydrocarbon products are fractionated into a series of products, including gas, gasoline, light gas oil, and heavy cycle gas oil. Some heavy cycle gas oil may be recycled to the reactor. The bottoms product, a "slurry oil", is conventionally allowed to settle. The catalyst rich solids portion of the settled product may be recycled to the reactor. The clarified slurry oil is a heavy product.

The "reactor vessel" into which the riser discharges primarily separates catalyst from cracked products and unreacted hydrocarbons and permits catalyst stripping.

Older FCC units use some or all dense bed cracking. Down flow operation is also possible, in which case catalyst and oil are added to the top of a vertical tube, or "downer," with cracked products removed from the bottom of the downer. Moving bed analogs of the FCC process, such as Thermofor Catalytic Cracking (TCC) are also known.

Further details of FCC processes can be found in: U.S. Pat. Nos. 3,152,065 (Sharp et al); 3,261,776 (Banman et al); 3,654,140 (Griffel et al); 3,812,029 (Snyder); 4,093,537, 4,118,337, 4,118,338, 4,218,306 (Gross et al); 4,444,722 (Owen); 4,459,203 (Beech et al); 4,639,308 (Lee); 4,675,099, 4,681,743 (Skraba) as well as in Venuto et al, Fluid Catalytic Cracking With Zeolite Catalysts, Marcel Dekker, Inc. (1979). The entire contents of these patents and publication are incorporated herein by reference.

Conventional FCC catalysts usually contain finely divided acidic zeolites comprising, e.g., faujasites such as Rare Earth Y (REY), Dealuminized Y (DAY), Ultrastable Y (USY), Rare Earth Containing Ultrastable Y (RE-USY), and Ultrahydrophobic Y (UHP-Y).

Typically, FCC catalysts are fine particles having particle diameters ranging from about 20 to 150 microns and an average diameter around 60-80 microns.

Catalyst for use in moving bed catalytic cracking unit (e.g. TCC units) can be in the form of spheres, pills, beads, or extrudates, and can have a diameter ranging from 1 to 6 mm.

Although many advances have been made in both the catalytic cracking process, and in catalyst for use in the process, some problem areas remain.

The catalytic cracking process is excellent for converting heavy hydrocarbons to lighter hydrocarbons. Although this conversion is the whole reason for performing catalytic cracking, the boiling range of the cracked product is frequently not optimum for maximum profitability. Usually the gasoline and fuel oil boiling range fractions are the most valuable materials. Light olefins ($C_2$–$C_{10}$ olefins) are highly valuable only if a refiner has a way to convert these olefins into gasoline boiling range materials via e.g. alkylation, or if these light olefins can be used for their petrochemical value. Light paraffins, $C_{10}^-$ materials, are generally not as valuable because of their relatively low octane. The very light paraffins, particularly propane, usually are not as valuable as gasoline. There are ever more stringent limitations on the allowable vapor pressure of gasoline, such that refiners can not blend as much light material into the gasoline as they would like to. Accordingly, there is great interest in converting "top of the barrel" components, or light hydrocarbons in the $C_{10}^-$ boiling range, into heavier products.

There is also a growing need in refineries to convert more of the "bottom of the barrel" or resid fractions into lighter components via catalytic cracking. Many FCC units today add 5-15 wt % resid, or non-distillable feed, to the catalytic cracking unit. Such heavy materials in the past were never considered as suitable feeds for catalytic cracking units, because of their high levels of Conradson Carbon, sodium, and dehydrogenation metals such as nickel and vanadium. The market for resids (bunker fuel oil, road asphalt) is so limited that refiners have turned to FCC as one way to upgrade the value of the resid fraction.

The most limiting factor in catalytic cracking of resids in conventional FCC units appears to be metals deposition on the catalyst. The nickel and vanadium in the resid deposit almost stoichiometrically on the FCC circulating catalyst inventory, leading to production of excessive amounts of "dry gas" during catalytic cracking. This problem can be ameliorated to some extent by adding metal passivators, such as antimony and/or tin, to passivate the nickel and vanadium components deposited on the catalyst due to processing of resid feed. Usually refiners are also forced to resort to very high levels of catalyst withdrawal and replacement, to maintain the metals levels on the catalyst at a tolerable level, and to maintain catalyst activity. This represents a large daily expense (for make-up catalyst) and presents a disposal problem because the spent catalyst has so much heavy metal on it.

Attempts have been made to modify catalytic cracking catalyst to accommodate heavy feeds. It is known that commercially available FCC catalysts with a high surface area, and an alumina rich matrix, are more resistant to deactivation from metals contamination than other FCC catalysts (Speronello, B. K. and Reagan, W. J., Oil and Gas Journal, Jan. 30, 1984, page 139). See also "Method Predicts Activity of Vanadium-Contaminated FCC Catalyst", E. L. Leuenberger, Oil and Gas Journal, July 15, 1985, page 125.

Another approach to metals passivation is disclosed in U.S. Pat. No. 4,372,841, incorporated herein by reference. Adding a hydrogen donor material to the reaction zone and passing catalyst through a reduction zone at high temperature at least partially passivates the catalyst.

Vanadium, when deposited on a catalyst, is fairly mobile and can migrate to zeolite sites, attack the zeolite and destroy it. This phenomenon was discussed in "Metals Resistant FCC Catalyst Gets Field Test," Jars, Dalen, Oil and Gas Journal, Sept. 20, 1982, Page 135.

Although catalyst manufacturers are working on catalysts which apparently can tolerate fairly high levels of metals, and thus permit conversion of more of the "bottom of the barrel" into light products, they have largely ignored the economically related problem of converting light materials, produced during cracking, into more valuable, heavier components.

We have discovered a cracking catalyst, a method for manufacturing and a catalytic cracking process using this catalyst, which is metals tolerant and can, in a preferred embodiment, change the product distribution from catalytic cracking. We have discovered a way to efficiently convert, in a catalytic cracking unit, the "bottom of the barrel" into more valuable products, and in a preferred embodiment, also convert the relatively low value "top of the barrel" materials (incidentally produced during cracking) into more valuable products boiling in the gasoline range.

BRIEF SUMMARY OF THE INVENTION

Accordingly, the present invention provides a layered catalytic cracking catalyst containing a core comprising at least 10 wt % of a large pore crystalline silicate and/or a large pore crystalline aluminophosphate, and/or a large pore crystalline silicoaluminophosphate, all of which are hereinafter referred to as large pore molecular sieves, and a shell comprising less than 10 wt % large pore molecular sieves.

In another embodiment, the present invention provides a catalytic cracking catalyst comprising a core containing 10 to 95 wt. % percent matrix material; 5 to 50 wt. % percent zeolite Y which optionally is partially dealuminized, 0.1-20 wt. % HZSM-5; and 0.1-20 wt. % Ga/ZSM-5, and a shell of material containing less than 10 wt. % large pore molecular sieves and comprising at least 1 wt. % of the overall layered cracking catalyst.

In a specialized embodiment, the present invention provides a catalytic cracking catalyst comprising a zeolite deficient shell comprising at least 10 wt % of a coating of a porous refractory material selected from the group of a rare earth oxide, aluminum oxide and aluminum phosphate composite, a magnesia, alumina, aluminum phosphate composite and a tin (IV) oxide composite around a core cracking catalyst containing at least 10 wt % rare earth Y zeolite in a matrix.

In another embodiment, the present invention provides a process for catalytic cracking of a hydrocarbon feed boiling in the gas oil and heavier boiling range to lighter products by contact of the feed in a catalytic cracking reactor at catalytic cracking conditions with a layered cracking catalyst comprising a core containing at least 10 wt % large pore molecular sieves and a shell containing less than 10 wt % large pore molecular sieves.

In another embodiment, the present invention provides a method of manufacturing a layered catalytic cracking catalyst comprising forming a core containing at least 10 wt % large pore molecular sieves by conventional means, and forming a shell comprising at least 1 wt. % of the overall layered cracking catalyst and containing less than 10 wt. % of the large pore molecular sieves around the core by contacting the pre-formed core with a large pore molecular sieve deficient (relative to the core) matrix and recovering a layered catalyst as a product.

BRIEF DESCRIPTION OF THE DRAWING

FIG. 1 is a schematic diagram of a conventional FCC reactor and regenerator.

DETAILED DESCRIPTION

FIG. 1 is a schematic flow diagram of an exemplary FCC unit. Feed is charged to the bottom of the riser reactor 2 via inlet 4. Hot regenerated catalyst is added via conduit 14, equipped with a flow control valve 16. A lift gas is introduced near the liquid and solid feed inlets via conduit 18. The riser reactor is an elongated, cylindrical smooth-walled tube.

The feed vaporizes and forms a dilute phase suspension with the FCC catalyst. The suspension passes up the riser, which generally gets wider to accommodate volumetric expansion. Cracked products and coked catalyst may pass into a solid-vapor separation means, such as a conventional cyclone. Preferably, the riser has a deflector and a short residence time stripper, as disclosed in U.S. Pat. No. 4,629,552 (Haddad and Owen) incorporated by reference. Another good design is the closed cyclone design disclosed in U.S. Pat. No. 4,749,471 (Kam et al) which is incorporated by reference. A means for stripping entrained hydrocarbons from the catalyst is usually provided in the base of vessel 6. Neither this stripping section, nor the solid-gas separation equipment is shown in the drawing for clarity. Such equipment is conventional. Cracked products are withdrawn from the reactor by conduit 8.

Stripped catalyst containing coke is withdrawn via conduit 10 and charged to regenerator 12. The catalyst is regenerated by contact with an oxygen-containing gas, usually air added via line 9. Flue gas is withdrawn from the regenerator by line 11.

Usually the feed temperature is about 150° C. to 375° C. The regenerator usually operates at about 650° C. to 750° C. and the catalyst to feed weight ratio is usually about 3:1 to 10:1, adjusted as necessary to hold a reactor outlet of about 450° C. to 550° C.

Cracked product from the FCC unit passes from outlet 8 to main fractionator 20, where product is separated into a heavy slurry oil stream 22, heavy distillate 24, light distillate 26, naphtha 28, and a light overhead stream 30, rich in $C_2$-$C_4$ olefins, $C_1$-$C_4$ saturates, and other light cracked gas components. This light stream is usually treated in an unsaturated gas plant 32 to recover various light gas streams, including $C_3$-$C_4$ LPG, and optionally $C_2$- fuel gas or the like.

Preferably a light, $H_2$ rich gas stream is recycled from the gas plant via line 34 for use as all, or part, of a lift gas used to contact catalyst in the base of riser 2.

The catalyst and process of the present invention work very well in the conventional FCC units described above, and in TCC units. The maximum benefit from the present invention is achieved when a heavy, metals containing residual feed is at least part of the feed to the catalytic cracking unit.

Feeds

Most FCC and TCC units crack gas oil or vacuum gas oil feeds, i.e., those having an initial boiling point above 400°-500° F., and an end boiling point above 750°-850° F.

The feed can include any wholly or partly non-distillable fraction, e.g. 650° C.+ boiling range material. Resids, deasphalted resids, tar sands, shale oils, coal liquids and similar heavy material, may be used as part or all of the feed.

Layered Catalyst

The catalysts used herein comprise a core containing at least one, and preferably three molecular sieve components, inside a shell layer of molecular sieve deficient material. We may refer to these catalysts hereafter as "layered" catalysts. The layered catalyst preferably comprises a core containing at least 10 wt. % large pore molecular sieve, as hereafter defined, surrounded by a porous shell.

SHELL

The shell comprises a molecular sieve deficient layer on the outside of the catalyst. Preferably less than 10 wt. % large-pore molecular sieves or other crystalline or highly structured cracking components are present in the shell layer.

The shell can be a conventional matrix material, such as alumina or silica-alumina. The function of the matrix in conventional catalytic cracking catalysts is well known. Briefly stated, the matrix protects the relatively soft and fragile molecular sieve components from physical damage. The matrix acts to some extent as a sodium sink, and minimizes localized high temperatures when burning coke from the molecular sieve.

In the present invention, the shell functions as a metals getter or sink and may achieve some cracking of extremely large molecules. Preferably a relatively soft, highly porous alumina, is used. Metals tend to deposit rapidly on such materials, and the gradual attrition of, e.g., the alumina permits metals to be removed from the unit with catalyst "fines".

The shell can thus perform, in a preferred embodiment, a dual role. The shell first provides a place for metals in the feed to deposit. This keeps Ni, V, etc, from the molecular sieve cracking components. Then the metals are removed with alumina, or other shell material, as "fines." Metals removal minimizes migration of metal, or formation of reactive species in the unit, such as pentavalent vanadium compounds in the regenerator.

Rather than remove the deposited metals by attrition, the metals can also be immobilized. Incorporation of compounds which react with Ni, V, Na, Fe, or other deposited metals to form stable metal compounds is beneficial. BaO, MgO, CaO, $La_2O_3$, $Ce_2O_3$ and similar alkaline and/or rare earth compounds form, e.g., stable vanadium compounds which neither migrate by solid-solid interactions nor form volatile vanadium compounds in the FCC regenerator.

The shell's second major role is conversion of extremely large molecules found in residual fractions. These large molecules can not fit readily into conventional large pore zeolites such as zeolite X or Y. The molecular sieve deficient shell may not be as selective a cracking catalyst as conventional zeolitic cracking catalysts, but only limited conversion of very large molecules in the feed is necessary to render these large molecules down to a size where they can be cracked by large pore zeolites. Pillared layered clays would be very effective at converting these very large molecules to ones capable of fitting into conventional large pore zeolites.

CORE

The core comprises a large pore molecular sieve, preferably zeolite Y. The core preferably also contains both a shape selective paraffin cracking/isomerization component, preferably HZSM-5 and a shape selective aliphatic aromatization catalyst, preferably GaZSM-5.

Large Pore Cracking Component

The large-pore molecular sieve cracking component may be a conventional zeolite. Some of these, and patents describing their preparation are discussed hereinafter. Zeolite L, zeolite X, zeolite Y, and preferably higher silica forms of zeolite Y such as Dealuminized Y (DAY; U.S. Pat. No. 3,442,795), Ultrastable Y (USY; U.S. Pat. No. 3,449,070), Ultrahydrophobic Y (UHP-Y; U.S. Pat. Nos. 4,331,694, 4,401,556), and similar materials are preferred for use herein. Zeolite beta (U.S. Pat. No. 3,308,069) or Zeolite L (U.S. Pat. Nos. 3,216,789; 4,544,539; 4,554,146 and 4,701,315) may also be used. These materials may be subjected to conventional treatments, such as impregnation or ion exchange with rare earths to increase stability. These patents are incorporated herein by reference.

These large-pore molecular sieves have a geometric pore opening of about 7 angstroms in diameter. In current commercial practice, most of the cracking of large molecules in the feed is done using these large pore molecular sieves.

Very Large Pore Cracking Component

In addition to the large-pore cracking components described above which have found extensive use commercially, several recently developed very large-pore cracking components may also be used. All of these materials have a geometric pore opening or portal greater than about 7 Angstroms in diameter.

VPI-5 is a molecular sieve with pore openings or portals larger than about 10 Angstrom units in diameter. It is an aluminophosphate type sieve with 18-membered rings of tetrahedrally-coordinated or T-atoms. Such molecular sieves have very large pore volumes, and extremely large pore openings. Such large pore sieves would be very useful for cracking the very large molecules associated with high boiling or residual fractions. By contrast faujasites have portals containing 12 membered rings. VPI-5 was described by M. Davis, C. Saldarriaga, C. Montes, and J. Garces in a paper presented at "Innovations in Zeolite Materials Science" Meeting in Nieuwpoort, Belgium, Montes, J. Garces and C. Crowder, Nature 331, 698 (1988).

Pillared, interlayered clays may also be used as a large pore cracking component. U.S. Pat. No. 4,742,033 discloses a pillared interlayered clay. This patent is incorporated by reference.

U.S. Pat. No. 4,515,901 discloses forming an interlayered pillared clay by mixing a clay with a polar solvent, a soluble carbohydrate, and a soluble pillaring agent. The mixture is then heated to form the interlayered pillared clay. Useful clays are smectites such as montmorillonite.

In U.S. Pat. No. 4,367,163, pillars of silica are added to smectites to increase the interplatelet distances. U.S. Pat. Nos. 4,515,901 and 4,367,163 are incorporated herein by reference.

U.S. Pat. No. 4,757,041, which is incorporated herein by reference, discloses a class of pillared interlayered clay molecular sieves products with regularly interstratified mineral structure. These materials are prepared by cross-linking interstratified mineral clay, and are reported to possess extraordinary thermal and hydrothermal stabilities.

U.S. Pat. No. 4,600,503 (Angevine et al), which is incorporated herein by reference, discloses thermally stable layered metal oxides containing interspathic polymeric oxides employed in hydrotreating catalyst used to upgrade residual oils. The layered materials disclosed in that patent may be used as all of part of the "large pore" cracking component of the catalyst of the present invention.

Published European patent application EP 0 284 278 A2 (Kirker et al), which is incorporated herein by reference, discloses hydrocracking a heavy feed containing polycyclic aromatics to form a lube based stock. The hydrocracking catalyst is a layered silicate such as magadiite which contains interspathic polymeric silica and interspathic polymeric oxides of one or more of Al, B, Cr, Ga, In, Mo, Nb, Ni, Ti, Tl, W and Zr. Such layered silicates may be used as all or part of the large pore cracking component of the present invention.

Published European Application EP 0 205 711 A2 (Chu et al), which in incorporated herein by reference, discloses layered oxides containing interlayer polymeric oxides and their synthesis. Layered oxides of high thermal stability and surface area which contain interlayer polymeric oxides such as polymeric silica are prepared by ion exchanging a layered metal oxide, such as layered titanium oxide, with organic cation to spread the layers apart. A compound, such as tetraethylorthosilicate, capable of forming a polymeric oxide, is thereafter introduced between the layers. The resulting product is treated to form polymeric oxide, e.g., by hydrolysis to produce the layered oxide product. Such layered materials may be as used all or part of the large pore cracking component of the present invention.

U.S. Pat. No. 4,238,364 discloses the preparation of stabilized pillared, interlayered clays. U.S. Pat. No. 4,665,220 discloses use of these clays as catalysts in reactions capable of catalysis by protons. The contents of both of these patents are incorporated herein by reference.

SAPO's, or silicon-substituted aluminophosphates, which have a three dimensional crystal framework of suitable size may also be used as the large pore cracking component. U.S. Pat. Nos. 4,440,871 and 4,741,892 and 4,689,138, which are incorporated herein by reference, disclose silicoalumino phosphate molecular sieves.

It should be emphasized that the process and catalyst of the present invention does not require the use of any single "large pore" cracking component. The large pore cracking component may comprise mixtures of one or more of the above materials, e.g., an equal mix of catalytically active forms of RE-USY, VPI-5 and a pillared clay.

Expressed as Constraint Index, CI, the large pore cracking component should have a CI of less than 1 and preferably less than 0.8. Details of the Constraint Index test procedures are provided in J. Catalysis 67, 218–222 (1981) and in U.S. Pat. No. 4,711,710 (Chen et al), both of which are incorporated herein by reference.

SHAPE SELECTIVE COMPONENT

The preferred, but optional, shape selective paraffin cracking/isomerization component can be any shape selective zeolite which at the conditions experienced in a catalytic cracking unit promotes formation of olefinic and/or iso-olefinic materials. Any zeolite having a Constraint Index of 1–12 can be used herein, but ZSM-5 is especially preferred.

Preferred shape selective zeolites are exemplified by ZSM-5, ZSM-11, ZSM-12, ZSM-23, ZSM-35, ZSM-48, ZSM-57 and similar materials.

ZSM-5 is described in U.S. Pat. No. 3,702,886, U.S. Pat. No. Re. 29,948 and in U.S. Pat. No. 4,061,724 (describing a high silica ZSM-5 as "silicalite").
ZSM-11 is described in U.S. Pat. No. 3,709,979.
ZSM-12 is described in U.S. Pat. No. 3,832,449.
ZSM-23 is described in U.S. Pat. No. 4,076,842.
ZSM-35 is described in U.S. Pat. No. 4,016,245.
ZSM-48 is described in U.S. Pat. No. 4,397,827.
ZSM-57 is described in U.S. Pat. No. 4,046,859.

These patents are incorporated herein by reference.

Zeolites in which some other framework element is present in partial or total substitution of aluminum can be advantageous. Elements which can be substituted for part of all of the framework aluminum are boron, gallium, zirconium, titanium and trivalent metals which are heavier than aluminum. Specific examples of such zeolites include ZSM-5 and zeolite beta containing boron, gallium, zirconium and/or titanium. In lieu of, or in addition to, being incorporated into the zeolite framework, these and other catalytically active elements can also be deposited upon the zeolite by any suitable procedure, e.g., impregnation.

Preferably, relatively high silica shape selective zeolites are used, i.e., with a silica/alumina ratio above 20/1, and more preferably with a ratio of 70/1, 100/1, 500/1 or even higher.

Preferably, the shape selective paraffin cracking/isomerization zeolite is placed in the hydrogen form by conventional means, such as exchange with ammonia and subsequent calcination The zeolite may be used in any form which promotes paraffin upgrading.

The preferred, but optional, shape selective aromatization component can be any zeolite having a Constraint Index of 1-12 and additional components which promote paraffin aromatization at catalytic cracking conditions.

Gallium exchanged or impregnated ZSM-5 is especially preferred for use herein because of its ability to convert light paraffins such as propanes and butanes into aromatic hydrocarbons which are valuable as petrochemicals or as high octane gasoline blending components. Gallium may be incorporated into the zeolite framework during synthesis or it may be exchanged or impregnated or otherwise incorporated into the ZSM-5 after synthesis. Preferably 0.05 to 10, and most preferably 0.1 to 2.0 wt. % gallium is associated with the aromatization zeolite.

On a matrix free basis, the relative ratios of the preferred three component zeolite core can vary greatly, depending on feedstocks, products desired, and to a lesser extent on catalytic cracking conditions.

In general, the function of the large pore cracking components is bulk conversion of heavy feed or of cracked asphaltenes or other large cracked products to lighter materials, including light paraffins and light olefins in the $C_2$-$C_{10}$ range.

The light paraffins are not preferred products. The $C_5^+$ paraffins tend to be relatively low in octane number. They can be upgraded by conventional means such as platinum reforming, but this increases costs. There is a significant yield loss during reforming, and reliance on reforming tends to increase the aromatics content of the gasoline pool.

The shape selective zeolite cracking/isomerization catalyst converts a significant portion of these paraffins to olefins and iso-olefins, with higher octane number, in the case of the $C_5^+$ olefins, and more reactivity in the case of the $C_4^-$ olefins.

The light olefins produced by the shape selective cracking/isomerization catalyst and by the large pore cracking catalyst can be easily upgraded in conventional alkylation units. In addition, the iso-olefins can be processed in etherification units to high octane oxygenates such as MTBE or TAME. By increasing the amount of shape selective cracking/isomerization catalyst present in the layered catalyst, it is possible to enhance the production of $C_2$-$C_{10}$ olefins and, via subsequent alkylation or etherification steps, increase gasoline yields and octane number, with aliphatic components rather than aromatic components.

The shape selective aromatization zeolite converts $C_{10}^-$ paraffins, and especially $C_4^-$ paraffins, to aromatics. The aromatics produced, primarily benzene, toluene, and xylene (BTX) are extremely valuable both as petrochemicals and for use in enhancing the octane number of the gasoline pool.

Preferably the conventional, large pore cracking component is present in an amount roughly equal to four times the combined amount of shape selective paraffin cracking/isomerization zeolite and shape selective paraffin aromatization zeolite. Thus, a catalyst whose core contains 80 wt. % RE-USY zeolite, 10 wt. % HZSM-5 and 10 wt. % GaZSM-5 (all on a matrix free basis) will give very good results. Expressed as weight percent of total catalyst, the layered catalyst would have the following composition when the layered catalyst contains 25 wt. % total zeolite:

| Overall | | Core g | Core wt. % | Shell g | Shell wt. % |
|---|---|---|---|---|---|
| Shell | 50 wt. % | | | | |
| Core: | 50 wt. % | | | | |
| 1) Matrix | 20 wt. % | 25 | 50 | 50 | 100 |
| 2) Large-pore molecular sieve | 20 wt. % | | 20 | 40 | |
| 3) HZSM-5 | 2.5 wt. % | | 2.5 | 5 | |
| 4) GaZSM-5 | 2.5 wt. % | | 2.5 | 5 | |

Preferably the zeolite content comprises 10-50 wt. % of the finished catalyst, with the remainder being matrix or shell.

CATALYST MANUFACTURE

Core

The core comprising one or more molecular sieves including, e.g., zeolites, and some binder, must be prepared first.

The different zeolite components can be wet ball milled or dry blended together, and then may be added to a suitable matrix, e.g. a silica-alumina gel, clay composite or an alumina-clay composite or a silica sol or other matrix such as an alumina rich sol and further mixed. The matrix and zeolite mixture can be extruded, prilled, marumerized, tabletted, dropped in an oil bath, etc. to form relatively large particles. For use in fluidized bed catalytic cracking units the matrix-zeolite mixture is preferably spray dried, but any other means can be used to make a fluidizable catalyst particle, such as crushing or grinding larger size extrudates or pills.

Layered Core

It is preferred, but not essential, to provide a layered core, with the large pore cracking component, such as zeolite Y, comprising the outermost layer of the core. The inner portion of the core can contain one or more of the shape selective, Constraint Index 1-12, zeolite catalysts for paraffin cracking/isomerization and/or for aromatization of aliphatics to aromatics.

In a preferred embodiment, the shape selective zeolite components, such as HZSM-5 and GaZSM-5 are mixed together with a conventional binder such as silica, or silica-alumina to form a first stage product. The first stage product should be then subjected to drying or calcination or other treatment to fix it in a stable enough form to maintain its integrity or green strength in subsequent steps, wherein the large pore molecular sieve cracking component is added as an external layer to the shape selective zeolite first stage product.

Shell

A shell can be added by taking the first stage product and spraying onto it a slurry or gel shell containing a reduced content of large pore molecular sieve(s).

The shell can be added by any other means which will add a molecular sieve deficient layer to the core material described above. In the case of an FCC catalyst, a spray dried core component can be sprayed with a gel or slurry containing an aqueous slurry of inorganic solids such as clay, silica, alumina and silica-alumina gel.

A uniform impregnation of a large preformed particle should be avoided, what is sought is coating, not impregnation. A preferred coating technique, and preferred equipment for carrying out the coating process, are discussed in Chapter 12 of Catalyst Manufacturer, A. B. Stiles, Marcel Dekker, Inc., 1983, which is incorporated herein by reference. The cores to be coated are placed in a rotating drum and a low zeolite "paint" is coated onto the core. The thickness of the paint layer is controlled by the amount of slurry which is coated on the cores. To build up a thicker core, multiple coating runs can be completed, or the coating apparatus, such as a Penwalt-F. J. Stokes coating pan, may be heated to permit continuous operation.

Yet another efficient way of adding a coating to the catalyst is the spherudizer. Spherudizing is a special technique of catalyst manufacture developed by the Dravo Corporation. A disk rotates at an angle while small spheres of a seed material (the core) are placed in the bottom part of the disk. A spray of a cohesive slurry (the "low zeolite" shell) is sprayed onto the smaller particles. A shell layer gradually forms and the spheres increase in size. By careful control of the size of the starting seeds, the rate of addition of the slurry shell material, and the rate of rotation of the disk, coated particles of a desired size can be obtained. Some experimentation may be necessary to determine the optimum core/shell formulation and preparation techniques using the spherudizer. Such routine experimentation is common to the use of the spherudizer, and well within those skilled in the catalyst manufacturing arts.

Although we have referred above to a zeolite deficient "paint", it should be emphasized that the "paint" may contain some zeolite content, and indeed preferably contains some large pore catalytic cracking components which may be zeolitic in nature. The shell can, and preferably does, have a dual role of protecting the inner shape selective zeolite-rich core, and of bringing about a measure of cracking of the extremely large molecules associated with heavy feeds. To promote some cracking of large molecules the paint may preferably contain some large pore zeolite, or most preferably contains some of the "large pore" zeolites as defined above, i.e., VPI 5, pillared clays, and/or some of the more conventional large pore zeolites such as X and Y.

Usually, economics will necessitate minimizing the zeolite content of the outer layer to protect to the maximum extent possible the zeolite content from the harsh environment encountered in the catalytic cracking reaction zone. A highly siliceous layer, just a few microns thick, will cause only a minimal change in diffusion distances necessary to effect cracking, while potentially reducing the vulnerability of the core of the layered catalyst to metals deposition from the crude.

The shell may frequently contain a minor amount of zeolite, because of sloppiness in the manufacturing process. Zeolites are relatively expensive materials and fragile zeolites in the shell would rapidly deactivate and be destroyed by metals and sodium in the feed. These zeolites will retain their crystallinity and cracking activity much longer if they are maintained within the zeolite rich core, and for that reason, zeolites are preferably absent from the shell.

METAL CONTROL

The catalyst and process of the present invention permit significantly improved control of metal deposition rates on catalytic cracking catalysts as compared to prior art catalysts. The zeolite-rich core can be effectively protected from metals attack by use of a metallophyllic or metal loving shell (such as alumina).

The operation can be best understood by discussing the use of an alumina bound, zeolite-rich core.

In this embodiment, a relatively soft, alumina shell is used. Such materials have an extremely high affinity for metals such as nickel and vanadium which are usually present in residual feed stocks. The soft materials are subject to fairly high attrition rates, so that the metals will be rapidly captured by the alumina matrix and removed from the unit as catalyst "fines" as the soft alumina abrades or attrits during use. The shell functions in a manner similar to an ablative heat shield on a re-entry vehicle, protecting the catalyst during repeated cycles through the cracking unit.

As the outer shell attrits, more and more of the molecular sieve rich core is exposed. Many of the molecular sieve components in the core have a low affinity for absorption of metals such as nickel and vanadium from the feed; however, they will deposit on the alumina rich shell of a neighboring un-attrited catalyst of the invention.

Use of a core matrix comprising a metal immobilizing compound, such as MgO, CaO, BaO, $La_2O_3$, $Ce_2O_3$ and similar alkaline and/or rare earth materials provides a further measure of protection. Any feed metals that penetrate the shell, or are deposited directly on the core because the shell is gone or damaged, will be neutralized by the core matrix if it contains a metal immobilizing compound. Incorporation of such materials in the shell is also beneficial, especially so when the shell is a relatively hard, durable material.

The core/shell catalyst of the present invention provides an efficient way of upgrading heavy, metals containing resids. The preferred, somewhat friable alumina shell material acts as a throw-away scavenger to preferentially absorb metals from the feed. These preferred catalysts are to some extent renewed during use by the gradual removal of the preferred, relatively soft and readily attritable shell material.

Of course using a relatively soft alumina material results in greater catalyst attrition and catalyst loss. This is not totally undesirable, in that it is much better for the unit to experience relatively high attrition losses (and relatively high metals removal) and have a makeup catalyst rate which balances catalyst lost daily through attrition. This is more efficient use of the zeolite cracking catalyst for cracking resid than removing 1-2% or more, per day of the circulating catalyst inventory to maintain metals contamination on the catalyst at a tolerably low level and to keep the cracking catalyst activity at a sufficiently high level to permit efficient cracking.

ATTRITING METAL TRAP COATING

In one embodiment of the present invention, the zeolite deficient shell comprises a surface coating which attrits and traps metal. A shell which is weakly bound to the catalyst, and attrits off during the catalytic cracking process to expose new sites of the coating. When the surface coating comprises at least one metal trapping component, it is possible to immobilize metals in the feed to the cracking unit on the surface coating, and to remove the metals from the cracking unit as the coating attrits off.

A preferred coating which acts in this way is a retractory porous material which comprises rare earth oxide, aluminum oxide and aluminum phosphate. Preferably the rare earth oxide, aluminum oxide and aluminum phosphate are present in a weight ratio of from about 10:20:70 to about 90:5:5. Such a coating is preferably sprayed or otherwise coated on the surface, rather than impregnated.

Other suitable coating materials include magnesia-alumina-aluminum phosphate gels, and tin (IV) oxide gels.

An especially preferred embodiment comprises a coating of a gel of magnesia-alumina-aluminum phosphate (MAAP) or a gel of lanthana-alumina-aluminum phosphate (LAAP) on a core catalyst such as a conventional cracking catalyst comprising at least 10 and preferably 20 wt % calcined REY in a silica-alumina-clay matrix.

Use of at least 2 wt % coating, based on the weight of the finished composite, is preferred. Operation with 10 wt % of a coating, such as the LAAP gel discussed above, should allow a majority of the vanadium in a typical cat cracker feed to be trapped on the catalyst surface.

More details regarding these preferred coatings are contained in our prior co-pending application U.S. Ser. No. 335,068, filed Apr. 7, 1989, which has been incorporated by reference.

EXAMPLES OF CATALYST PREPARATION

A layered catalyst is prepared by coating a core which consists of a catalyst with a shell which consists of $Al_2O_3$-MgO cogel.

The core component is prepared according to the procedure described next. 2400 gms of Davison Z-14US, 300 gms of NH ZSM-5, 300 gms of GaZSM-5 (all weights on ignited basis), each in form of a 30% ball-milled slurry containing deagglomerated particles (95% 2 microns), are added together with 1304 gms of 50% aluminum chlorhydrol (23% $Al_2O_3$, 8% Cl, Reheis Co.) and 2700 gms of Kaolin clay (ignited basis, Georgia Kaolin) in a 15 gallon Nalgene container containing 5996 gms of DI water. The mixture is subjected to high shear conditions using a Cowles Dissolver (Morehouse Industries; Fullerton, Calif.) equipped with a 6.5" blade turning at 700–800 rpm for 30 minutes to prepare a pre spray-dryer slurry. The solids content of the slurry is adjusted between 25–40% using additional DI water, as necessary. Also, the slurry pH is adjusted between 4.0–4.6 using 20% H or 50% $NH_4OH$, as necessary. The slurry is then spray-dried at 370° F. outlet temperature. The spray dryer (Komline-Sanderson; Peapack, N.J.) is operated at 5.5 psig air pressure with 0.06" nozzle at 250 cc/minute feed rate using a Moyno feed pump (Springfield, Ohio). The spray dried particles are air calcined for 2 hours at 1000° F. in a muffle furnace. Subsequently the catalyst is first column exchanged with $1.0NH_4NO_3$ solution followed by a slurry exchange using a solution containing 0.75% rare earth chlorides (prepared from 60% AR solution, Davison Specialty Chemicals). Both exchanges are carried out @5/1, solution/catalyst weight ratio. The catalyst is next dried at 250° F. overnight before use. The nominal catalyst composition is 40% RE-USY (Z-14US), 5% HZSM-5, 5% GaZSM-5 and 50% matrix (10% alumina binder, 90% clay).

The shell component is first prepared in the precursor form as described next. Reagent grade $Al(NO_3)_3.9H_2O$ (1985.0 gms) is dissolved in 10000 gms of DI water. Separately $Mg(NO_3)_2.6H_2O$ (192.0 gms) is dissolved in 10000 gms of DI water. The solutions are combined and neutralized with 20% $NH_4OH$ while vigorously stirring to a final value of 9.0 pH over a period of 30 minutes. The resultant gel is filtered and reslurried to 5% solids and homogenized for 5 minutes just prior to its use as described next.

Using Yamato Model GA-21 Fluidized Bed Spray Granulator Dryer, 200 gms of the shell precursor is sprayed into a heated (200° C.) fluid bed of 190 gms. of the core component to prepare the layered catalyst. Additional batches of the layered catalyst are prepared in the same manner.

ILLUSTRATIVE EMBODIMENT

The following illustrative embodiment does not represent an actual experiment. It is an estimate, but one based on much other experimental work.

The illustrative embodiment is an estimate of the yields obtainable in a conventional FCC unit charging the same feed, at the same conditions, and changing only the catalyst compositions.

I. (Prior Art) The conventional catalyst represents a conventional large pore zeolite based cracking catalyst in a matrix. No ZSM-5 is present.

II. (Prior Art) Represents a conventional cracking catalyst plus 2.0 wt % HZSM-5.

III. Represents yields obtainable from a catalyst containing a bulk conversion component, e.g., USY and containing 1.0 wt. % GaZSM-5 and 1.0 wt. % HZSM-5. The GaZSM-5 and HZSM-5 are present in equimolar amounts. The GaZSM-5 contains 1 wt % Ga in the ZSM-5 framework.

IV. Represents a catalyst with the GaZSM-5 and HZSM-5 present in a separate particle, encapsulated in an alumina matrix.

| % of FF | Conv. (No ZSM-5) I | Conv. + ZSM-5 II | Conv. & GaZSM-5 & ZSM-5 III | Con. & GaZSM/ZSM-5 & Alumina Matrix IV |
|---|---|---|---|---|
| Gasoline | 51.1 | 49.5 | 49.7 | 49.7 |
| Paraffins | 22.7 | 21 | 21 | 21 |
| Olefins | | | | |
| $C_6^-$ | 3.8 | 4.5 | 4.0 | 4.0 |
| $C_7^+$ | 10.6 | 10.0 | 10.0 | 10.0 |
| Aromatics | 8.5 | 8.5 | 9.2 | 9.2 |
| Naphthenes | 5.5 | 5.5 | 5.5 | 5.5 |
| LCO | 16 | 16 | 16 | 16.8 |
| HCO | 8 | 8.0 | 8 | 7.0 |
| $C_3^= + C_4^=$ | 8.7 | 10.3 | 10.1 | 10.1 |
| $C_2^-$ | 3.5 | 3.5 | 3.5 | 3.5 |
| Gasoline Composition | | | | |
| Paraffins | 44.5 | 42.5 | 42.5 | 42.5 |
| Olefins | 28.0 | 29.5 | 28 | 28 |
| Naphthenes | 11 | 11 | 11 | 11 |
| Aromatics | 16.5 | 17 | 18.5 | 18.5 |
| Gasoline Octane No. | | | | |
| Research Clear | 92.6 | 93.6 | 94.0 | 94.0 |

We claim:

1. A layered catalytic cracking catalyst having a core comprising at least 10 wt. % of at least 1 molecular sieve having a portal comprised of at most a 12 membered ring and a shell with a reduced content of said molecular sieve, relative to said molecular sieve's concentration in said core.

2. The catalyst of claim 1 wherein the core comprises at least 1 molecular sieve having a portal comprising a 12-membered ring.

3. The catalyst of claim 2 wherein the molecular sieve having a portal comprising a 12-membered ring is selected from the group of zeolite L, zeolite X, zeolite Y, Dealuminized Y, Ultrastable Y and Ultrahydrophobic Y.

4. The catalyst of claim 3 containing at least one rare earth element.

5. The catalyst of claim 1 wherein the core also comprises at least 10 wt. % of a molecular sieve having an effective pore opening greater than about 10 angstrom units.

6. The catalyst of claim 1 wherein the core also contains at least one of VPI-5 and pillared, layered clays.

7. The process of claim 1 wherein the core comprises zeolite beta.

8. The catalyst of claim 1 wherein the core comprises at least one molecular sieve having a Constraint Index of 1-12.

9. The catalyst of claim 1 wherein the core contains 0.1 to 25 wt. % of at least one of ZSM-5, ZSM-11, ZSM-12, ZSM-23, ZSM-35, ZSM-48 and ZSM-57.

10. The catalyst of claim 1 wherein the core contains 0.1 to 20 wt. % of a molecular sieve having a Constraint Index of 1-12 and paraffin cracking/isomerization activity.

11. The catalyst of claim 1 wherein the core contains 0.1 to 20 wt. % of a molecular sieve having a Constraint Index of 1-12 and paraffin aromatization activity.

12. The catalyst of claim 1 wherein the core comprises 0.1 to 20 wt. % of a molecular sieve having a Constraint Index of 1-12, and said molecular sieve contains 0.05 to 10 wt. % gallium on an elemental metal basis.

13. The catalyst of claim 1 wherein the shell comprises 60-90 percent alumina.

14. The catalyst of claim 1 wherein the core comprises 50-99 weight % of the layered cracking catalyst and the shell comprises 50-1 weight %.

15. The catalyst of claim 1 wherein the shell is essentially free of molecular sieves having portal comprising a 12 or less membered ring.

16. The catalyst of claim 1 wherein the shell comprises at least 1 wt % of magnesium, barium, calcium, lanthanum, cerium, and compounds thereof.

17. The catalyst of claim 1 wherein the average particle diameter of the layered catalyst is about 80 microns, the shell comprises at least 10 weight % of the layered catalyst, and the shell has a porosity, density, and hardness such that a majority of the shell will be removed by abrasion and attrition within 20 days of use in a fluidized catalytic cracking unit.

18. The catalyst of claim 17 wherein a majority of the shell is removed within 5 days of use.

19. The catalyst of claim 1 wherein the core comprises:
 (i) 5-50 wt. % large pore molecular sieve;
 (ii) 0.1-20 wt. % shape selective zeolite having paraffin cracking/isomerization activity;
 (iii) 0.1-20 wt. % shape selective zeolite having paraffin aromatization activity;
 (iv) 10-95 wt. % matrix material.

20. The catalyst of claim 19 wherein the core comprises an inner core containing a majority of the shape selective zeolites having a Constraint Index of 1-12 and an outer core containing a majority of the large pore molecular sieves.

21. A catalytic cracking catalyst containing a core and a shell, said core comprising:
 (i) 10-95 wt. % percent matrix material;
 (ii) 5-50 wt. % percent zeolite Y;
 (iii) 0.1-20 wt. % HZSM-5;
 (iv) 0.1-20 wt. % GaZSM-5;
said shell comprising at least 1 weight % of the overall cracking catalyst and containing less than 10 wt % molecular sieves.

22. A method of manufacturing a layered catalytic cracking catalyst comprising;
 a) forming a core comprising at least 10 wt. % large pore molecular sieve component by conventional means, and
 b) forming a shell comprising at least 1 wt. % of the overall catalyst and containing less than 10 wt % large pore molecular sieve around the core by contacting the pre-formed core with a molecular sieve deficient matrix, relative to the core matrix, and recovering a layered catalyst as a product.

23. The method of claim 22 wherein the core comprises at least 10 wt. % large pore molecular sieve, and at least 1 wt. % ZSM-5.

24. The catalyst of claim 1 wherein the zeolite deficient shell comprises at least 10 wt % of a coating comprising a refractory porous material selected from the group of:
 a) a rare earth oxide, aluminum oxide and aluminum phosphate composite;
 b) a magnesia, alumina, aluminum phosphate composite; and
 c) a tin (IV) oxide composite; and
the core comprises a cracking catalyst containing at least 10 wt % of rare earth Y zeolite in a matrix comprising silica and alumina.

* * * * *